United States Patent
Lorenz

(10) Patent No.: US 11,345,459 B2
(45) Date of Patent: May 31, 2022

(54) WING FOR AN AIRCRAFT

(71) Applicant: Airbus Operations GmbH, Hamburg (DE)

(72) Inventor: Christian Lorenz, Weyhe (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 413 days.

(21) Appl. No.: 16/420,715

(22) Filed: May 23, 2019

(65) Prior Publication Data

US 2019/0359311 A1 Nov. 28, 2019

(30) Foreign Application Priority Data

May 28, 2018 (DE) .......................... 102018112736.7

(51) Int. Cl.
*B64C 3/56* (2006.01)
(52) U.S. Cl.
CPC ...................................... *B64C 3/56* (2013.01)
(58) Field of Classification Search
CPC .... B64C 3/56; B64C 3/54; B64C 1/30; B64C 3/00; B64C 3/42; B64C 5/08; B64C 5/10; B64C 23/65; B64C 23/72; Y02T 50/30; Y02T 50/10
See application file for complete search history.

(56) References Cited

U.S. PATENT DOCUMENTS

| | | | | | |
|---|---|---|---|---|---|
| 2,289,224 | A | * | 7/1942 | Anderson | B64C 3/56 244/49 |
| 2,468,425 | A | * | 4/1949 | Joseph | B64C 3/56 74/520 |
| 3,139,248 | A | * | 6/1964 | Alvarez-Calderon | B64C 3/42 244/207 |
| 3,333,792 | A | * | 8/1967 | Alvarez-Calderon | B64C 3/54 244/218 |
| 5,201,479 | A | * | 4/1993 | Renzelmann | B64C 3/56 244/49 |
| 9,517,834 | B2 | * | 12/2016 | Thompson | B64C 3/56 |
| 9,908,612 | B2 | * | 3/2018 | Fox | B64C 3/56 |
| 10,501,167 | B2 | * | 12/2019 | Kracke | B64C 3/56 |
| 2003/0155839 | A1 | * | 8/2003 | Krimmer | H01F 7/1607 310/264 |
| 2014/0014768 | A1 | * | 1/2014 | Lassen | B64C 3/56 244/49 |

(Continued)

FOREIGN PATENT DOCUMENTS

| GB | 2530572 | 3/2016 |
|---|---|---|
| GB | 2530578 | 3/2016 |

OTHER PUBLICATIONS

German Search Report for DE 102018112736.7, dated Jan. 28, 2019, 9 pages.

(Continued)

*Primary Examiner* — Medhat Badawi

(74) *Attorney, Agent, or Firm* — Nixon & Vanderhye P.C.

(57) ABSTRACT

A wing for an aircraft is disclosed having a fixed wing and a foldable wing tip portion mounted to the fixed wing via a hinge rotatable about a hinge axis between an extended position and a folded position. The wing may include an actuation unit with reduced complexity, and may include a ground latch device for latching the foldable wing tip portion in the folded position.

15 Claims, 4 Drawing Sheets

(56) References Cited

U.S. PATENT DOCUMENTS

| | | | | |
|---|---|---|---|---|
| 2015/0014478 | A1* | 1/2015 | Lassen | B64C 3/56 |
| | | | | 244/49 |
| 2016/0090170 | A1* | 3/2016 | Thompson | B64C 3/56 |
| | | | | 701/3 |
| 2017/0349296 | A1* | 12/2017 | Moy | B64C 3/56 |
| 2017/0355438 | A1* | 12/2017 | Bishop | B64C 3/56 |

OTHER PUBLICATIONS

Translation Certificate and English Translation of German Search Report issued in DE 102018112736.7, dated Jan. 28, 2019, 10 pages.

* cited by examiner

WING FOR AN AIRCRAFT

CROSS REFERENCE TO RELATED APPLICATION

This application claims priority to and incorporates by reference German Application Number DE 10 2018 112736.7, filed May 28, 2018.

BACKGROUND

1. Field of the Invention

The present disclosure relates to a wing for an aircraft, in particular to a foldable wing including a fixed wing and a foldable wing tip portion. A further aspect of the disclosure relates to a ground latch device for latching a foldable wing tip portion of a wing for an aircraft in a folded position with respect to a fixed wing. Yet a further aspect of the disclosure relates to an aircraft comprising such a wing and/or such a ground latch device.

2. Description of Related Art

Such a wing comprises a fixed wing for being mounted to a fuselage, and a foldable wing tip portion mounted to the fixed wing via a hinge or hinges rotatable about a hinge axis between an extended position, where the foldable wing tip portion extends as a continuous extension of the fixed wing preferably in a common plane with the fixed wing, and a folded position, where the foldable wing tip portion extends upwards or rearwards in order to reduce the overall span of the aircraft compared to the extended position. Specifically, when the foldable wing tip portion is foldable upwards, the hinge axis extends in a horizontal plane and/or in parallel to a chord line and/or in parallel to the wing surface and/or in a flight direction of the aircraft. Alternatively, when the foldable wing tip portion is foldable rearwards, the hinge axis extends in a vertical direction and/or in a wing depth direction and/or in a direction transverse or perpendicular to the wing surface.

The wing may comprise an actuation unit for actuating the foldable wing tip portion for movement about the hinge axis relative to the fixed wing, i.e. for movement between the extended and the folded positions. The actuation unit might be formed in various ways, e.g. as a rack and pinion drive, and might be mounted between the fixed wing and the foldable wing tip portion near the hinge axis.

Foldable wings are developed in order to reduce the space requirements of an aircraft during maneuver and parking on ground. As soon as the aircraft has landed the foldable wing tip portions of the wings are folded upwards or rearwards, thereby reducing the overall span of the aircraft.

In the extended position the foldable wing tip portion is usually secured by an individual arresting device. However, in the folded position, when the aircraft is on the ground, the foldable wing tip portion is usually held only by the actuation unit. This means the actuation unit needs to be designed not only to move but also to hold the foldable wing tip portion in place.

SUMMARY

A wing having an actuation unit with reduced complexity is disclosed herein.

The wing comprises a ground latch device for latching the foldable wing tip portion in the folded position, i.e. when the aircraft is on the ground. In such a way, the actuation unit does not need to hold the foldable wing tip portion in the folded position and therefore can be designed with reduced complexity. Further, a failure of the actuation unit does not lead to the foldable wing tip portion moving out of the folded position.

According to an embodiment, the ground latch device is formed separately and independently from a flight latch device for latching the foldable wing tip portion in the extended position. Such an individual ground latch device can be designed specifically for latching the folded position and does not need to meet the requirements for latching the extended position. Further, the ground latch device is formed separately and independently from the actuation unit. This allows the ground latch device to be actuated individually and separately from the actuation unit, thereby reducing complexity of both the actuation unit and the ground latch device.

According to another embodiment, the ground latch device comprises a base part, a latch element and a latch motor. The base part is mounted, i.e. fixedly connected to a respective part of the wing, i.e. to the fixed wing or to the foldable wing tip portion, for example, near the hinge. The base part might also be mounted to the wing via other parts. The latch element is mounted to the base part movably between a latched position, where the latch element inhibits the foldable wing tip portion from moving out of the folded position, and an unlatched position, where the latch element allows the foldable wing tip portion to move out of the folded position. The latch motor is configured for driving the latch element for movement between the latched position and the unlatched position, and may be an electric or hydraulic motor. In such a way, a particularly simple and reliable ground latch device is formed.

In particular, the latch element may be mounted to the base part pivotally about a latch axis between the latched position and the unlatched position, wherein the latch motor drives the latch element about the latch axis between the latched position and the unlatched position. Such a pivotally movable latch element is very simple, reliable and space efficient. However, in other embodiments the latch element may be moved between the latched and unlatched position in another way, for example, by translational motion along or across its direction of extension, or by a curved path.

The latch element may have an elongated form, and may be extending perpendicular to the latch axis from an inner end, may be at the latch axis, to an outer end, and may be remote from the latch axis. This relates to simple and efficient form for the latch element.

The latch element may have a wedge-shaped cross section, when viewed across the direction of extension of the latch element, for example, from the inner end to the outer end. This shape of the cross section may extend continuously along the extension of the latch element from the inner end to the outer end. In such a way, a particularly effective latch element is formed that can be clamped between the fixed wing and the foldable wing tip portion.

According to an exemplary embodiment, in the latched position the latch element extends in a recess or gap that opens between parts of the foldable wing tip portion and the fixed wing below the hinge axis when the foldable wing tip portion is moved into the folded position. In this recess the latch element is clamped from opposite sides between a first clamping element mounted to or part of the fixed wing and a second clamping element mounted to or part of the foldable wing tip portion. In such a way, for example, wedge-shaped latch element is clamped between the first and second clamping elements and blocks their relative movement, so that the foldable wing tip portion cannot move out of the folded position. Opposite from the latch element the foldable wing tip portion in the folded position, for example, rests against a stopper provided at the fixed wing, so that the foldable wing tip portion is clamped between the stopper and the latch element.

In particular, the first and second clamping elements may relate to respective lugs of a flight latch device for latching the foldable wing tip portion in the extended position. The lugs are generally formed to be aligned and commonly receive a latch bolt to latch the foldable wing tip portion in the extended position. When the lugs are aligned they are located below the hinge axis with respect to a wing thickness direction of an aircraft in a normal position on the ground. When the foldable wing tip portion is in the folded position, a gap-formed recess opens between the lugs of the fixed wing and the lugs of the foldable wing tip portion. The shape of the latch element may be adapted to tightly fit into the recess. In such a way, the installation of the ground latch device requires only minimum changes to the existing wing.

According to a further embodiment, in the latched position the latch element extends in parallel to the hinge axis. In such a way, the latch element has a maximum effective surface and is loaded homogeneously by the clamping elements.

According to yet a further embodiment, the latch axis is perpendicular to the hinge axis. In such a way, the latch element may easily be pivoted such that it extends in parallel to the hinge axis.

A further aspect of the present disclosure relates to a ground latch device for latching a foldable wing tip portion of a wing for an aircraft in a folded position with respect to a fixed wing, as used in the wing according to any of the afore-described embodiments. The features and effects described above in connection with the wing apply vis-à-vis to the ground latch device. Specifically, the ground latch device comprises a base part, a latch element and a latch motor. The base part is mounted to a respective part of the wing, i.e. to the fixed wing or to the foldable wing tip portion, for example, near the hinge. The latch element is mounted to the base part pivotally about a latch axis between a latched position, where the latch element inhibits the foldable wing tip portion from moving out of the folded position, and an unlatched position, where the latch element allows the foldable wing tip portion to move out of the folded position. The latch motor is configured for driving the latch element for movement about the latch axis, and is for example, an electric or hydraulic motor. In such a way, a particularly simple and reliable ground latch device is formed.

In particular, the latch element may include an elongated form extending perpendicular to the latch axis from an inner end at the latch axis to an outer end remote from the latch axis. The latch element may have a wedge-shaped cross section, when viewed across the direction of extension of the latch element from the inner end to the outer end. This shape of the cross section may extend continuously along the extension of the latch element from the inner end to the outer end. In such a way, a particularly effective latch element is formed that can be clamped between the fixed wing and the foldable wing tip portion.

Yet a further aspect of the present invention relates to an aircraft comprising a wing according to any of the embodiment described above or a ground latch device according to any of the embodiment described above. The features and effects described above in connection with the wing and the ground latch device apply vis-à-vis to the aircraft.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
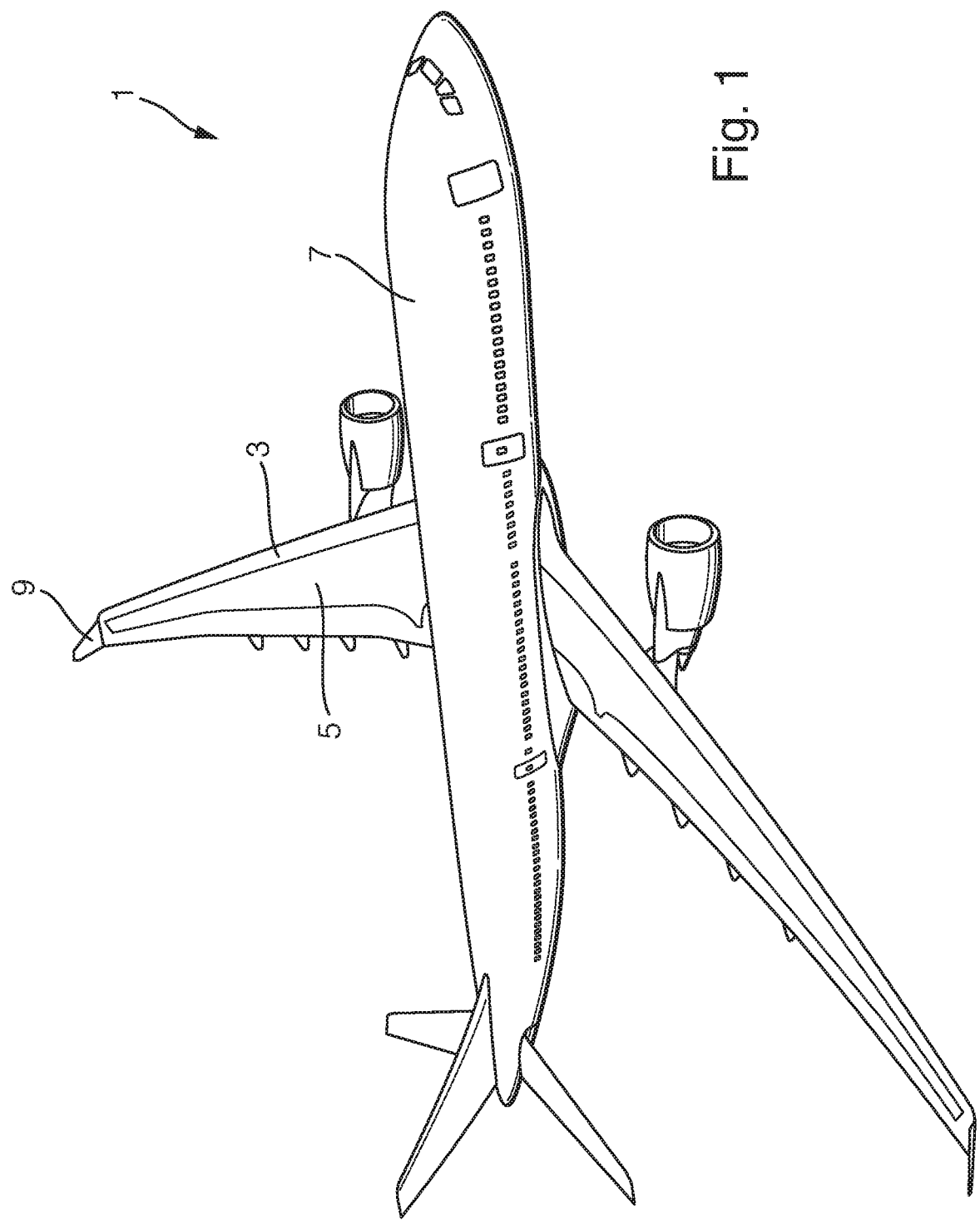
FIG. 1 is a perspective view of an aircraft according to an embodiment of the invention.

FIG. 1 shows an exemplary aircraft 1 according to an embodiment of the present invention. The aircraft 1 comprises a foldable wing 3 including a fixed wing 5 mounted to a fuselage 7, and a foldable wing tip portion 9 movably mounted to the fixed wing 5.

Figure 2:
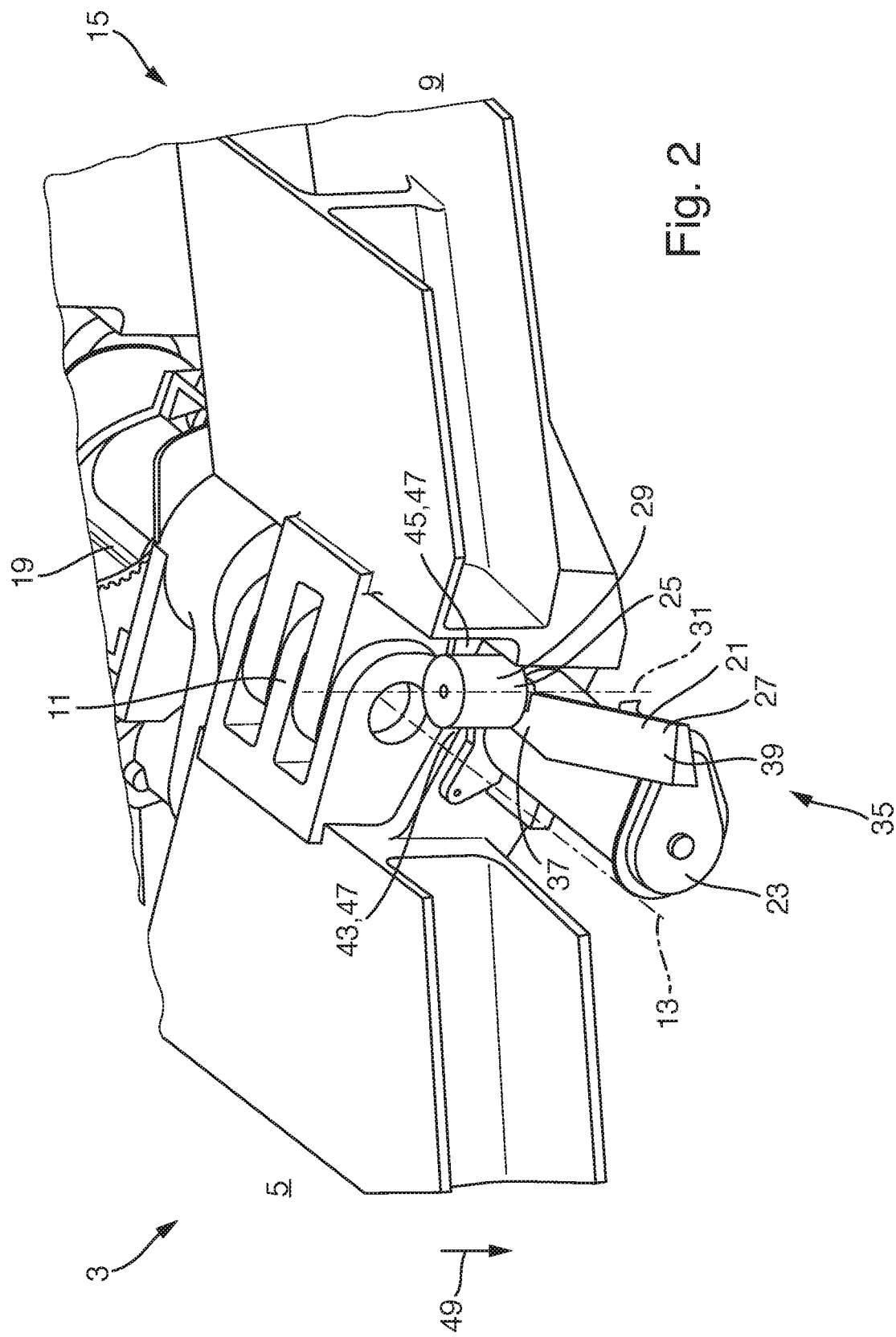
FIG. 2 is a perspective view of a ground latch unit at a wing of the aircraft shown in FIG. 1, wherein a latch element is in an unlatched position.
Figure 3:
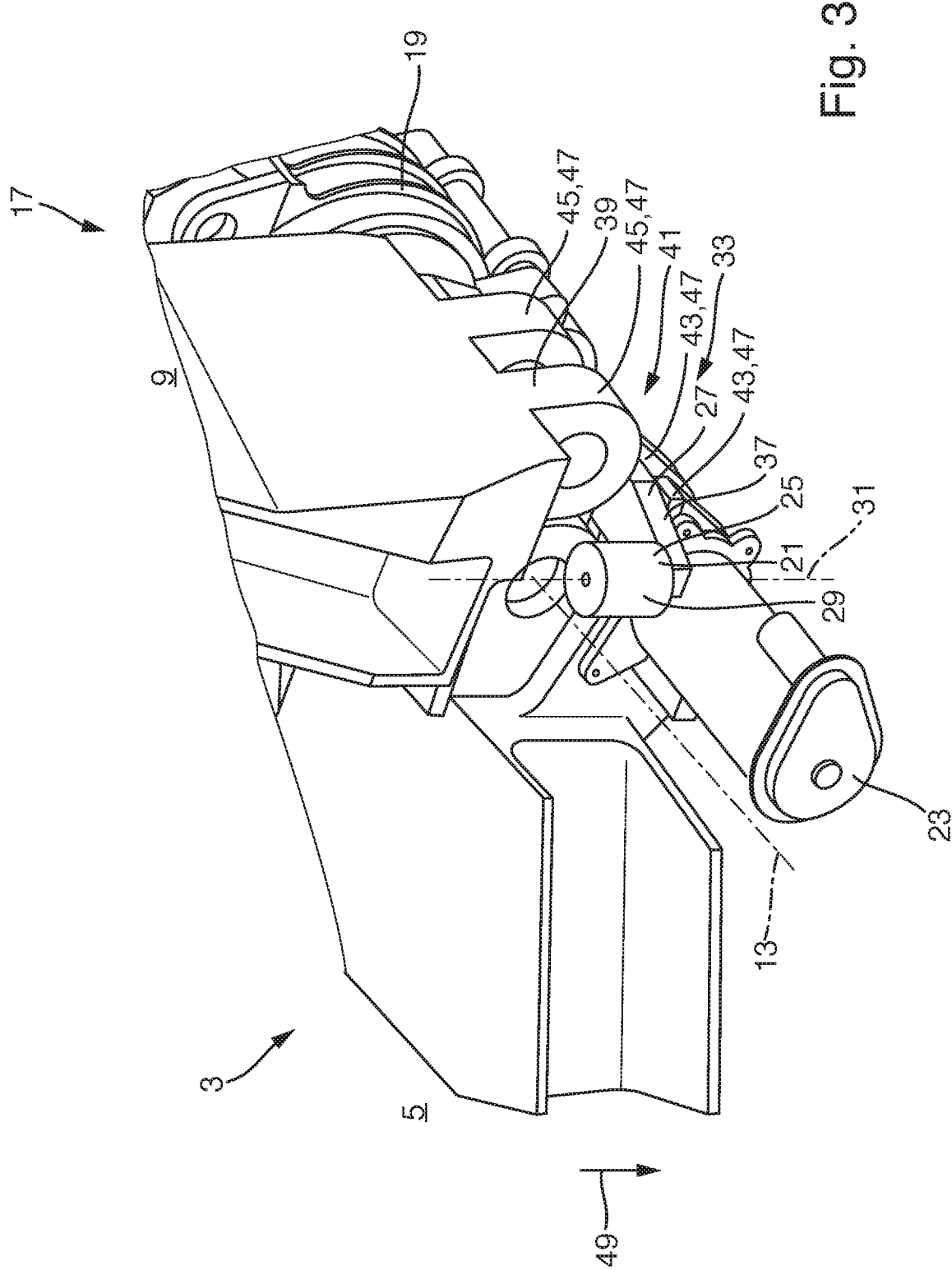
FIG. 3 is a perspective view of the ground latch unit shown in FIG. 2, wherein the latch element is in a latched position.
Figure 4:
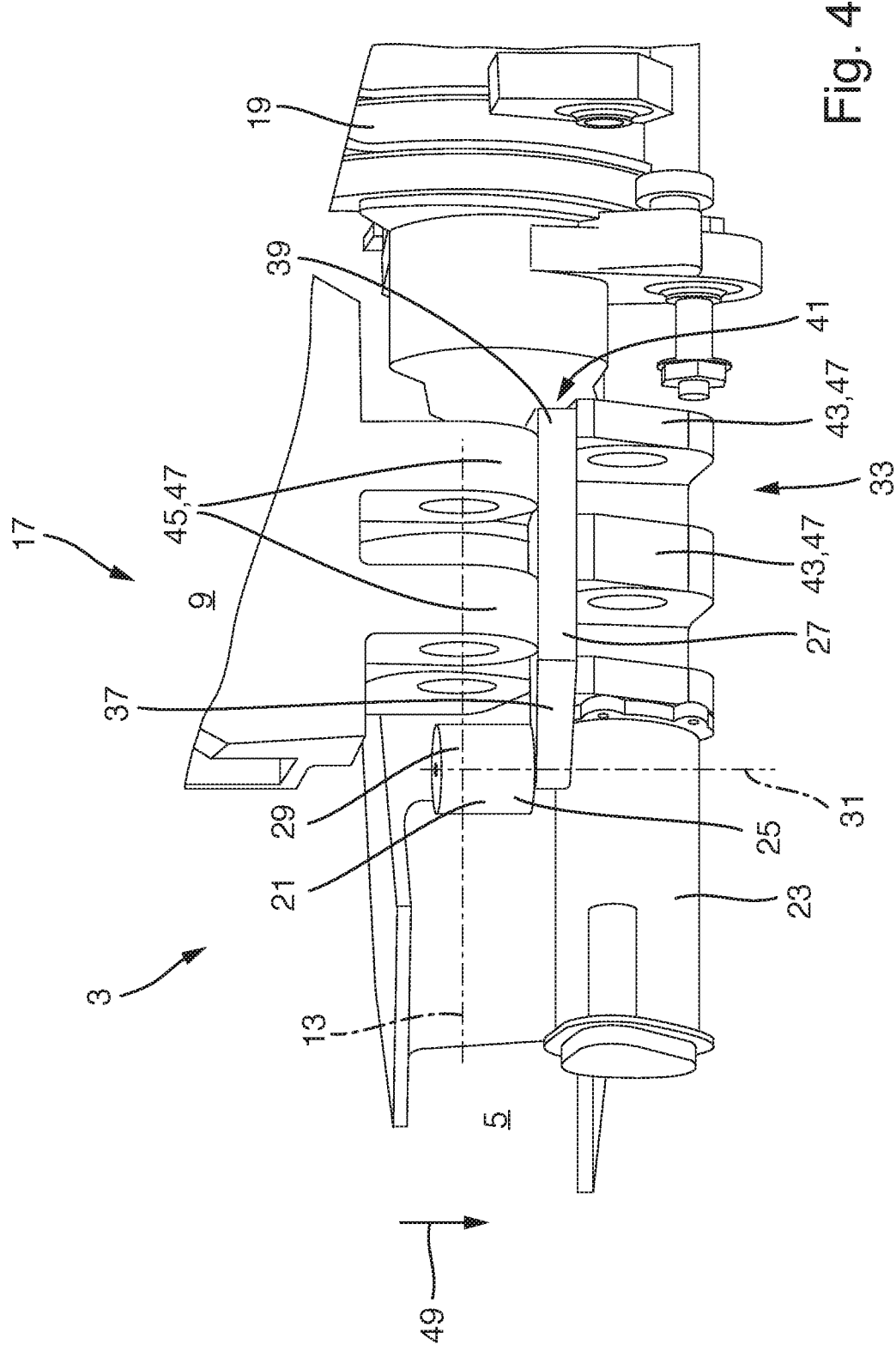
FIG. 4 is a different perspective view of the ground latch unit as shown in FIG. 3.

FIGS. 2 to 4 illustrate the wing 3 of the aircraft 1 shown in FIG. 1 in further detail. The foldable wing tip portion 9 is mounted to the fixed wing 5 via hinges 11 rotatable about a hinge axis 13 between an extended position 15 (see FIG. 2) and a folded position 17 (see FIGS. 3 and 4). In the extended position 15 the foldable wing tip portion 9 extends as a continuous extension of the fixed wing 5 in a common plane with the fixed wing 5, wherein in the folded position 17 the foldable wing tip portion 9 extends upwards in order to reduce the overall span of the aircraft 1. The hinge axis 13 extends in parallel to a chord line and in a flight direction of the aircraft 1. Further, the wing 3 comprises an actuation unit 19 for moving the foldable wing tip portion 9 about the hinge axis 13 relative to the fixed wing 5.

The wing 3 further comprises a ground latch device 21 for latching the foldable wing tip portion 9 in the folded position 17. The ground latch device 21 is formed separately and independently from a flight latch device 23 for latching the foldable wing tip portion 9 in the extended position 15. Further, the ground latch device 21 is formed separately and independently from the actuation unit 19.

The ground latch device 21 comprises a base part 25, a latch element 27 and a latch motor 29. The base part 25 is mounted to the fixed wing 5 near the hinge axis 13. The latch element 27 is mounted to the base part 25 pivotally about a latch axis 31 between a latched position 33, where the latch element 27 inhibits the foldable wing tip portion 9 from moving out of the folded position 17, and an unlatched position 35, where the latch element 27 allows the foldable wing tip portion 9 to move out of the folded position 17. The latch motor 29 is configured for driving the latch element 27 for movement about the latch axis 31.

The latch element 27 has an elongated form extending perpendicular to the latch axis 31 from an inner end 37 at the latch axis 31 to an outer end 39 remote from the latch axis 31. Further, the latch element 27 has a wedge-shaped cross section, when viewed across the direction of elongate extension of the latch element 27 from the inner end 37 to the outer end 39. The ground latch device 21 is arranged such that the latch axis 31 is perpendicular to the hinge axis 13. In the latched position 33 the latch element 27 extends in parallel to the hinge axis 13.

In the latched position 33 the latch element 27 extends inside a recess 41 that opens between the foldable wing tip portion 9 and the fixed wing 5 below the hinge axis 13 when the foldable wing tip portion 9 is moved into the folded position 17. In this recess 41 the latch element 27 is clamped from opposite sides between a first clamping element 43 mounted to the fixed wing 5 and a second clamping element 45 mounted to the foldable wing tip portion 9. The first and second clamping elements 43, 45 in the present embodiment relate to respective lugs 47 of the flight latch device 23 for latching the foldable wing tip portion 9 in the extended position 15. The lugs 47 are located below the hinge axis 13 with respect to a wing thickness direction 49.

The wedge-shaped latch element 27 is clamped between the first and second clamping elements 43, 45, i.e. between the opposite, corresponding lugs 47 of the fixed wing 5 and the foldable wing tip portion 9, and blocks their relative movement, so that the foldable wing tip portion 9 cannot move out of the folded position 17. The shape of the latch element 27 is adapted to tightly fit into the recess 41.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a fixed wing, and
a foldable wing tip portion mounted to the fixed wing via a hinge rotatable about a hinge axis parallel to a chord line of the fixed wing between an extended position and a folded position extending upwardly,
wherein the wing comprises a ground latch device for latching the foldable wing tip portion in the folded position,
wherein the ground latch device comprises
a base part mounted to the wing,
a latch element mounted to the base part movable between a latched position where the latch element extends in an opening disposed between the foldable wine tip portion and the fixed wing when the foldable wing tip portion is moved into the folded position, and an unlatched position, and
a latch motor for driving the latch element for movement between the latched position and the unlatched position.

2. The wing according to claim 1, wherein the ground latch device is formed separately and independently from a flight latch device for latching the foldable wing tip portion in the extended position, and is formed separately and independently from an actuation unit for actuating the foldable wing tip portion for movement about the hinge axis.

3. The wing according to claim 1, wherein the latch element is mounted to the base part pivotally about a latch axis between the latched position and the unlatched position, wherein the latch motor drives the latch element about the latch axis.

4. The wing according to claim 3, wherein the latch element has an elongated form extending perpendicular to the latch axis from an inner end at the latch axis to an outer end remote from the latch axis.

5. The wing according to claim 1, wherein the latch element has a wedge-shaped cross section, when viewed across the direction of extension of the latch element.

6. A wing for an aircraft, comprising:
a fixed wing, and
a foldable wing tip portion mounted to the fixed wing via a hinge rotatable about a hinge axis between an extended position and a folded position,
wherein the wing comprises a ground latch device for latching the foldable wing tip portion in the folded position,
wherein the ground latch device comprises a latch element,
wherein in the latched position the latch element extends in a recess that opens between the foldable wing tip portion and the fixed wing when the foldable wing tip portion is moved into the folded position, and
wherein the latch element is clamped from opposite sides between a first clamping element mounted to the fixed wing and a second clamping element mounted to the foldable wing tip portion.

7. The wing according to claim 6, wherein the first and second clamping elements relate to respective lugs of a flight latch device for latching the foldable wing tip portion in the extended position.

8. The wing according to claim 1, wherein in the latched position the latch element extends in parallel to the hinge axis.

9. The wing according to claim 1, wherein the latch axis is perpendicular to the hinge axis.

10. A ground latch device for latching a foldable wing tip portion of a wing for an aircraft in a folded position with respect to a fixed wing, the ground latch device comprising:
a base part configured to mount to the wing,
a latch element mounted to the base part pivotally about a latch axis between a latched position, wherein the latch element extends in a recess that opens between the foldable wing tip portion and the fixed wing when the foldable wing tip portion is moved into the folded position, where the latch element is configured to inhibit a foldable wing tip portion from moving out of the folded position, and an unlatched position, where the latch element is configured to allow a foldable wing tip portion to move out of the folded position, and
a latch motor for driving the latch element about the latch axis.

11. The ground latch device according to claim 10, wherein the latch element has an elongated form extending perpendicular to the latch axis from an inner end at the latch axis to an outer end remote from the latch axis.

12. The ground latch device according to claim 10, wherein the latch element has a wedge-shaped cross section, when viewed across the direction of extension of the latch element from the inner end to the outer end.

13. An aircraft comprising the wing according to claim 11, comprising the ground latch device including a base part configured to mount to the wing, a latch element mounted to the base part pivotally about a latch axis between a latched position, where the latch element is configured to inhibit a foldable wing tip portion from moving out of the folded position, and an unlatched position, where the latch element is configured to allow a foldable wing tip portion to move out of the folded position, and a latch motor for driving the latch element about the latch axis.

14. A wing for an aircraft, comprising:
a fixed wing, and
a foldable wing tip portion mounted to the fixed wing via a hinge rotatable about a hinge axis between an extended position and a folded position,
wherein the wing comprises a ground latch device for latching the foldable wing tip portion in the folded position
wherein the ground latch device comprises
a base part mounted to the wing,
a latch element mounted to the base part movable between a latched position, where the latch element inhibits the foldable wing tip portion from moving out of the folded position, and an unlatched position, where the latch element allows the foldable wing tip portion to move out of the folded position, and
a latch motor for driving the latch element for movement between the latched position and the unlatched position
wherein in the latched position the latch element extends in a recess that opens between the foldable wing tip portion and the fixed wing when the foldable wing tip portion is moved into the folded position, and
wherein the latch element is clamped from opposite sides between a first clamping element mounted to the fixed wing and a second clamping element mounted to the foldable wing tip portion.

15. A wing for an aircraft, comprising:
a fixed wing, and
a foldable wing tip portion mounted to the fixed wing via a hinge rotatable about a hinge axis between an extended position and a folded position,
wherein the wing comprises a ground latch device for latching the foldable wing tip portion in the folded position
wherein the ground latch device comprises
a base part mounted to the wing,
a latch element mounted to the base part movable between a latched position, where the latch element inhibits the foldable wing tip portion from moving out of the folded position, and an unlatched position, where the latch element allows the foldable wing tip portion to move out of the folded position, and
a latch motor for driving the latch element for movement between the latched position and the unlatched position
wherein in the latched position the latch element extends in a recess that opens between the foldable wing tip portion and the fixed wing when the foldable wing tip portion is moved into the folded position,
wherein the latch element is clamped from opposite sides between a first clamping element mounted to the fixed wing and a second clamping element mounted to the foldable wing tip portion,
wherein the first and second clamping elements relate to respective lugs of a flight latch device for latching the foldable wing tip portion in the extended position.

* * * * *